United States Patent [19]

Webber

[11] 4,144,571
[45] Mar. 13, 1979

[54] VEHICLE GUIDANCE SYSTEM

[75] Inventor: William F. Webber, Dallas, Tex.

[73] Assignee: E-Systems, Inc., Dallas, Tex.

[21] Appl. No.: 777,776

[22] Filed: Mar. 15, 1977

[51] Int. Cl.² .............................................. G01C 21/12
[52] U.S. Cl. .................... 364/450; 244/175; 244/180; 244/182; 343/7 TA; 364/429
[58] Field of Search .............. 364/450, 453, 424, 429; 244/175, 185–189, 181, 182; 343/7 TA, 5 LS, 9, 112 A, 112 C, 112 S, 7 ED; 114/144 B

[56] References Cited

U.S. PATENT DOCUMENTS

| | | | |
|---|---|---|---|
| 3,328,795 | 6/1967 | Hallmark | 364/450 |
| 3,345,017 | 10/1967 | Olah | 244/185 |
| 3,702,477 | 11/1972 | Brown | 343/112 C |
| 3,844,242 | 10/1974 | Sernatinger et al. | 114/144 B |
| 3,918,662 | 11/1975 | Vircks et al. | 244/182 |
| 4,046,341 | 9/1977 | Quinlivan | 244/181 |

Primary Examiner—Charles E. Atkinson
Assistant Examiner—Errol A. Krass
Attorney, Agent, or Firm—Robert V. Wilder

[57] ABSTRACT

Terminal guidance of vehicles is accomplished by accurately determining true position and speed of the vehicle from terrain contour measurements and updating a dead reckoning navigation system with precision to permit navigation by following a programmed flight path. A narrow beam radar altitude sensor measures vehicle clearance altitudes and a reference altitude sensor measures the vehicle clearance above a reference level. These measurements are input to a digital processor for comparison to stored digital terrain contour reference data. Recursive data matching is performed in the digital processor by a nonlinear Kalman filtering technique to provide vehicle position and vehicle velocity correction signals to a navigation controller that generates steering commands to the vehicle control system. Three vehicle position and three vehicle velocity signals are generated and updated in the nonlinear Kalman filtering technique to give near real-time three dimensional position and velocity information.

13 Claims, 5 Drawing Figures

VEHICLE GUIDANCE SYSTEM

This invention relates to a vehicle guidance system, and more particularly to a system for locating the position of a vehicle, movable over a surface which varies in elevation, at discrete points along a navigation path.

In the past several years, tremendous strides forward have been taken in the field of navigational dead reckoning techniques. Among recent developments in this field have been the introduction of computers and the development of velocity, acceleration, and direction sensing devices of high accuracy. However, despite the tremendous advances made in dead reckoning guidance systems employed for bringing a craft or vehicle precisely to a certain geographic location, a fix-taking correctional guidance system must still be used in conjunction with the dead reckoning system because of the characteristic accumulation of dead reckoning error in the latter, if high accuracy of navigation is required.

Generally speaking, the reference data necessary for use in a correctional system can be derived by several techniques and from a variety of sources. Two common methods use celestial observation and the recognition of some earth-fixed parameter. While stellar monitoring can usually be satisfactorily employed at high altitudes, several factors prevent its use in high-speed, low-altitude vehicles. First, weather and cloud cover impose operational limitations in land and air vehicles and in vessels operating at and near the surface of water. Secondly, a turbulent boundary layer is formed during low and medium altitude flights of aerial vehicles which causes image diffusion and defraction and threfore a corresponding degradation in accuracy. Obviously, optical observation of stellar bodies is not readily practicable, in the case of a vessel traveling deep beneath the surface of a body of water, for providing stellar reference data for fix-taking.

One earth fixed parameter data source is topographic information. Many guidance systems were devised in the past which, at least in aircraft, made use of topographic information as reference data for fix-taking. Some of these systems made use of radar derived topographic data, and large efforts were expended in developing radar map matching techniques. Systems of this type have been in existence for roughly ten years, but have never been completely satisfactory because, primarily, of their high degree of complexity.

It will be understood that, as employed herein, the term "navigation" refers to the conducting of aircraft and ships from place to place and further is intended to refer, and expressly does refer, to the conducting of any other body from place to place. Thus, while the specific example provided herein is in connection with an aircraft, the sequence of elevations, relative to some fixed reference, from one to the other along a given series of discrete points on the ocean bottom is as unique as along a similar series of points on land, and the elevation sequence along a series of spaced points on land is no less unique when the points are passed over by a land-contacting vehicle than when flown over by an aircraft. The invention, therefore, is specifically applicable also to the navigation of submarine vessels and land vehicles and, in fact, of any body which moves over a surface, the earth's crust being one example thereof, whose altitude varies from place to place with reference to a given altitude datum. While, in the specific example, altimeters are referred to as preferred means for determining both the absolute altitude of an aircraft relative to a reference datum and the height of the aircraft above the earth, the invention is by no means limited to the use of such instruments and its scope is such as to include, in other applications, the use of fathometers and/or pressure-sensing devices giving information indicative of the altitude of the earth's crust and specifically the interval separating a vessel from the ocean bottom and/or surface.

While the term "terrain" ordinarily has been employed, in the past, with references to land areas, it is expressly adopted and employed herein as a term referring to any surface area, such as that of the earth's crust, whether that area be covered with water or air.

Previously proposed fix-taking and navigational systems have sought to utilize terrain elevation data, and they have been based upon the analog comparison of sample data, which are the continuous, analog representation of continuous variations in terrain elevations, with similar data contained in contour maps employed as such. At least some of the sample and known data hence have always been graphically or photographically displayed on actual sheets of paper, rectangles of photographic film, etc., and the values represented thereby have been shown as physically measurable along at least two axes. Because of the nature of the data employed, cumbersome and unwieldly equipments for photographic development, superposition of map over map, orthogonal adjustments of one set of data relative to another, etc. have been unavoidable sources of added weight, complexity, error, and malfunction.

One significant improvement of such analog comparison systems is described in U.S. Pat. No. 3,328,795 which does not employ continuously recorded, analog data, but has as one of its bases the use of quantized terrain altitude information taken at discrete points. A numerical comparison of sample and prerecorded data is performed at high speed, and with results predictable and repeatable for the same inputs, by a digital computer. Since the digital computer and associated components are relatively unaffected by noise, vibrations, nuclear radiation, etc., no equipment is required for performing two-dimensional data comparisons, and no feedback or nulling circuitry is needed for determining the point of best physical correlation of the sample with the prerecorded data. As distinguished from systems utilizing analog information, the digital computer is free from the sources of error unavoidably present where analog comparisons are made and hence is not only more accurate but is able to tolerate relatively large errors in sample and known data values without compromising fix-taking accuracy.

Basically the navigation system as described in U.S. Pat. No. 3,328,795 involved the lifting of the contour signature of the prospective navigation region or regions, from available sources such as contour maps or stereo photos. As a vehicle proceeds over the navigation region, a sensor system measures the contour signature of a terrain sample along the vehicle navigation track. As described in U.S. Pat. No. 3,328,795, the terrain sample is nominally five miles in length to obtain uniqueness and it can be curved or straight. The sample of the measured contour signature from along the navigation track is trial-matched with stored terrain signatures of similar samples from all over the navigation region. The objective of the matching is to determine the location within the navigation region from which the sample of measured navigation track signature was taken. When a best match is determined, the navigation system of U.S. Pat. No. 3,328,795 position fixes within the region and the system updates a dead reckoning navigation subsystem in appropriate coordinates.

Functionally, the navigation system of the present invention updates the vehicle position data on a point by point basis and is an improvement over the navigation system of U.S. Pat. No. 3,328,795 which utilizes elongated terrain samples for vehicle location. At each terrain masurement, the vehicle position and vehicle velocity data are updated such that the updated data is equal to the previous data, plus the movement of the vehicle due to a measured velocity, plus movement due to a bias in the velocity measurement, plus a characteristic error term. In computing the updated data, ground clearance measurements and measurements of absolute altitude above a reference are compared with stored reference data at the predicted vehicle position. As distinguished from a terrain path comparison technique, three vehicle position measurements and three vehicle velocity measurements are updated at each data sample using recursive computation techniques based on past measurement data.

An ideal fix-taking guidance system should possess operational flexibility and should perform satisfactorily where nuclear radiation or other adverse environmental and/or flight conditions exist. Moreover, the system should preferably possess the attributes of simplicity, accuracy, and reliability and desirably should be compact and light-weight.

In accordance with the present invention, a vehicle navigation system includes terrain sampling means for determining at spaced time intervals the elevation of terrain beneath the vehicle and generate data samples of terrain elevation. A dead reckoning guidance system provides vehicle position and vehicle velocity signals that are computationally combined with the data samples of terrain elevation and prerecorded terrain data contained in a data storage means. A computational processor responds to the samples of terrain elevation, vehicle position and velocity signals and the prerecorded terrain data to generate discrete signal samples of navigation commands, vehicle velocity correction and vehicle position correction. A navigation controller receives the signal samples from the computational processor to generate vehicle navigation update signals.

A more complete understanding of the invention and its advantages will become apparent from the following description when read in light of the accompanying drawings.

Referring to the drawings.

Vehicle navigation in accordance with the present invention is accomplished by a system that determines the position of the vehicle with respect to a sequence of reference data, which system employs discrete data items relating to variations in elevation of the terrain relative to a reference datum. The individual discrete data items are representative of measurements of elevation variation of a surface and form a unique pattern to identify the position of a vehicle in a navigation track. Digital reference data is used to describe actual terrain variation which is a standard by-product of the map making process at the Defense Mapping Agency Topographic Center. A standard Class A, 1/50,000 scale, contour map prepared from a photo data base is suitable for providing stored reference data for operation of the navigation system of the present invention. This produces a sequence of discrete surface elevation data that is arithmetically combined with measured data taken at points on the surface and data from a dead reckoning as to the estimated position of a vehicle. Six error signals are produced, three identifying requirements for vehicle positional correction and three defining correction action for vehicle velocity.

Figure 1:
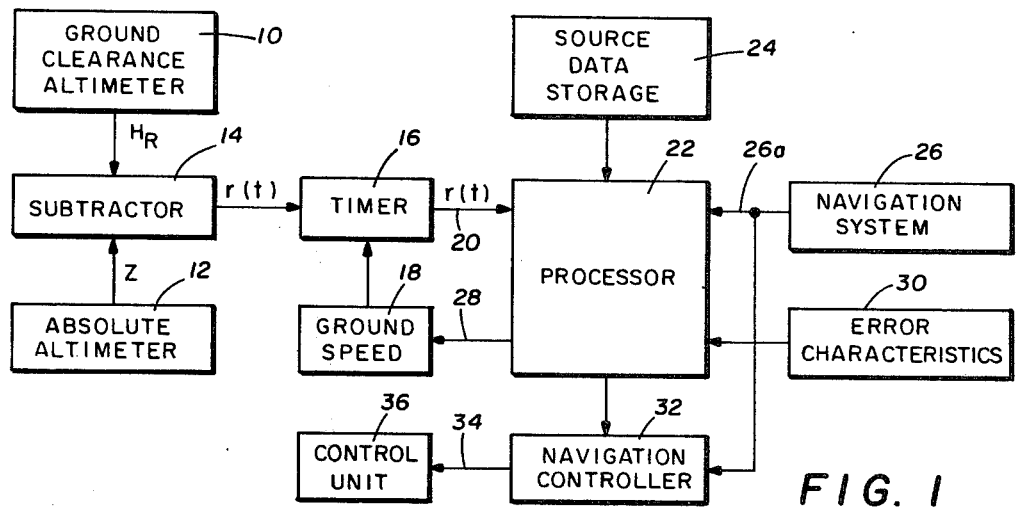
FIG. 1 is a block diagram of one embodiment of the vehicle navigation system of the present invention.

Referring to FIG. 1, this shows one embodiment of a navigation system including a ground clearance altimeter 10 and an absolute altimeter 12 each providing altitude information to a subtracter 14 that outputs terrain elevation data to a timer 16 that operates from the output of a ground speed indicator 18. By operation of the ground speed indicator 18, discrete samples of terrain elevation data are provided on a line 20 to a computational processor 22. Also coupled to the computational processor 22 is data storage 24 which contains prerecorded terrain intelligence data composed of discrete terrain elevation samples derived from standard map data, as explained. Additional data provided to the computational processor 22 includes three-dimensional vehicle position data and three-dimensional vehicle velocity data from a navigation system 26, which may be any conventional dead reckoning guidance system. Vehicle velocity data from the navigation system 26 is used to drive the ground speed indicator 18. To enable the computational processor 22 to minimize system error signals, error characteristic data is provided from an error characteristic storage 30.

Functionally, the computational processor 22 arithmetically combines the input data provided thereto to generate output signals to a navigation controller 32, which output signals include three states (three-dimension) of vehicle position and three states of vehicle velocity. An output of the navigation controller 32 are steering commands on the line 34 to a control unit 36, which control unit may be a conventional autopilot for providing steering to an aircraft along a desired navigation path.

In the preferred embodiment of the invention, the ground clearance altimeter 10 is a narrow beam radar altitude sensor used to measure vehicle clearance altitudes producing measurements in the form of digital data. Even though the beam of the radar sensor is narrow, (less than 3°), a considerable area of the terrain is illuminated by the radar at a high altitude, and preferably the sensor includes means for completing a simple transformation for removing the radar error. This simple transformation consists of adding up antenna gain weighted areas beginning with the terrain nearest the vehicle (clearance range) and progressing to longer clearance ranges until the power return crosses the power threshold. Any error due to this transformation may be minimized by designing a sensor to detect a very low threshold. With regard to the absolute altimeter 12, preferably this is of the barometric type and employs sensing means such as a vertical accelerometer in conjunction therewith to sense incorrect or spurious altitude deviations in applications where such deviations are significant. Again, the absolute altimeter 12 may be designed to provide digital data reflecting the measurement of the altitude of a vehicle above a reference data, such as sea level.

Both the digital output from the clearance altimeter 10 and the absolute altimeter 12 are input to the subtractor 14, which is a device well within the art having a digital output, at any given time, of the elevation of a terrain point directly beneath the vehicle as defined by the following equation:

$$r(t) = Z_R - H_R \tag{1}$$

where:
r(t) = terrain elevation,
$Z_R$ = vehicle clearance above a reference, and
$H_R$ = vehicle clearance above the terrain.

The output of the subtractor 14 is supplied to the timer 16 which controls the spacing of the terrain data sample points in accordance with aircraft ground speed, indications of which are supplied to the timer 16 by the ground speed indicator 18. In this manner, the spacing of the terrain data sample points is made to conform to the spacing required to provide accurate update of vehicle position and vehicle velocity.

Under the term "navigation system," as indicated by the block 26, have been included those components normally included in a dead reckoning navigation system. Briefly, a dead reckoning navigation system may have means including an inertial platform which is gyroscopically stabilized and has mounted thereon accelerometers to detect the vehicle accelerations relative to the inertial space. The output of each platform sensor is a three-dimensional data representation of vehicle position, and vehicle velocity applied to the computational processor 22, and in addition to the navigation controller 32. These platform sensor output signals are acted upon by the navigation controller 32 which in turn sends guidance signals to the vehicle flight control unit 36. From the inertial platform information, and from the correctional signals from the computational processor 22, the navigation controller 32 produces a solution, which may be continuous, to guide a vehicle along a geographic flight path and provide signals to the control unit 36 which are such as to produce, within the degree of error inherent in navigation systems, the desired flight path. It is this inherent error, the magnitude of which increases with time, that the present vehicle navigation system seeks to minimize.

Minimizing the error in the guidance system to achieve accurate vehicle navigation is achieved by the computational processor 22 responding to the measured terrain elevation data on the line 20 and the stored terrain elevation data from the source data storage 24 to produce a differential error signal representing the difference in the measured terrain elevation and the stored terrain elevation at the position identified by inputs to the computational processor 22 from the navigation system 26. This terrain elevation error is computed by the processor 22 in accordance with the expression:

$$\Delta H_R = \Delta Z_R - \Delta r(t) - \delta r(t)/\delta X \, \Delta X - \delta r(t)/\delta Y \, \Delta Y + e \tag{2}$$

where:
$Z_R$ = vehicle clearance above a reference,
r(t) = terrain elevation above the same reference,
e = measurement errors, and
the partial derivatives represent the terrain slope in the X direction and Y direction, respectively.

Figure 2:
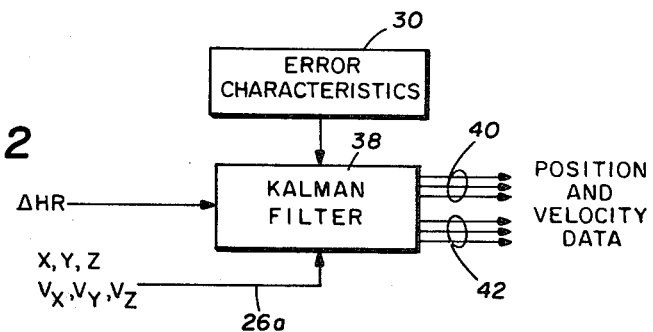
FIG. 2 is a functional diagram of the computational processor of FIG. 1.

This error in the terrain elevation between the true position of the vehicle above a measured terrain elevation and the predicted position of the vehicle based upon stored terrain information is one variable of a Kalman filtering technique such as schematically illustrated in FIG. 2. The Kalman filter is represented by a block 38 also receiving inputs from the error characteristic storage 30 and vehicle position and velocity data signals from the navigation system 26 on the line 26a. These data signals are used in the Kalman filtering technique to generate on the line 40 three position signals, one related to each of the three major axes. Also output from the Kalman filtering technique are three velocity signals on lines 42, again related to the three major axes.

Kalman filtering is a well known technique and is described in detail in the literature, and in particular in the Journal of Basic Engineering, March 1960, an article by R. E. Kalman, entitled "A New Approach to Linear Filtering and Prediction Problems."

The computational processor 22 for carrying out the Kalman filtering technique contains computational units that are necessary to perform the required Kalman filtering. Since division in a computer can be performed as a series of subtractions and since subtraction can be performed by an adder in conjunction with a complementer, only adders, complementers, and sign and magnitude comparators are needed in the solution of the equations in the Kalman filtering technique. In the computation of error signals to the navigation controller 32, assume that the vehicle velocity measurements $V_x(t)$, $V_y(t)$, and $V_z(t)$ are inputs to the processor 22 from the navigation system 26. Also assuming that the velocity errors from the navigation system 26 are slowly varying, then the vehicle position can be described as:

$$x(t_{k+1}) = x(t_k) + \int_{t_k}^{t_{k+1}} V_x(\tau)d\tau + \tag{3}$$
$$(t_{k+1} - t_k)b_x(t_k) + w_x(k)$$

$$y(t_{k+1}) = y(t_k) + \int_{t_k}^{t_{k+1}} V_y(\tau)d\tau + \tag{4}$$
$$(t_{k+1} - t_k)b_y(t_k) + w_y(k)$$

$$z(t_{k+1}) = z(t_k) + \int_{t_k}^{t_{k+1}} V_z(\tau)d\tau + \tag{5}$$
$$(t_{k+1} - t_k)b_z(t_k) + w_z(k),$$

where the velocity error components of the position signals are expressed as follows:

$$b_x(t_{k+1}) = b_x(t_k) + w_x(k) \tag{6}$$

$$b_y(t_{k+1}) = b_y(t_k) + w_y(k) \tag{7}$$

$$b_z(t_{k+1}) = b_z(t_k) + w_z(k). \tag{8}$$

Utilizing the Kalman filtering technique for a solution to the above equations, navigation system errors can be minimized by sequentially processing the radar clearance measurements $\Delta H_R$, as given by Equation (2), and input to the filtering routine 38. By arithmetically combining the inputs to the Kalman filter routine 38 the current vehicle position and vehicle velocity can be calculated based on a sequence of past and present measurements. The computational processor 22 accomplishes this by linearizing the measurement equation about the current estimate of vehicle position and then updates the position using linear system Kalman filtering.

The above may be stated as follows: the vehicle position after update [X(t$_{k+1}$)] is equal to the position before update [X(t$_k$)] plus vehicle movement due to measured velocity plus movement due to bias in the velocity measurement plus an error term. The velocity error equations (6, 7, 8) indicate that the velocity bias after update is equal to the velocity bias before update plus the error correction factor. Lastly, the differential terrain elevation equation (2) indicates the radar measurement is equal to the altitude above a reference datum Z$_R$ minus the elevation of terrain r(t) at that point h(x,y).

Figure 3:
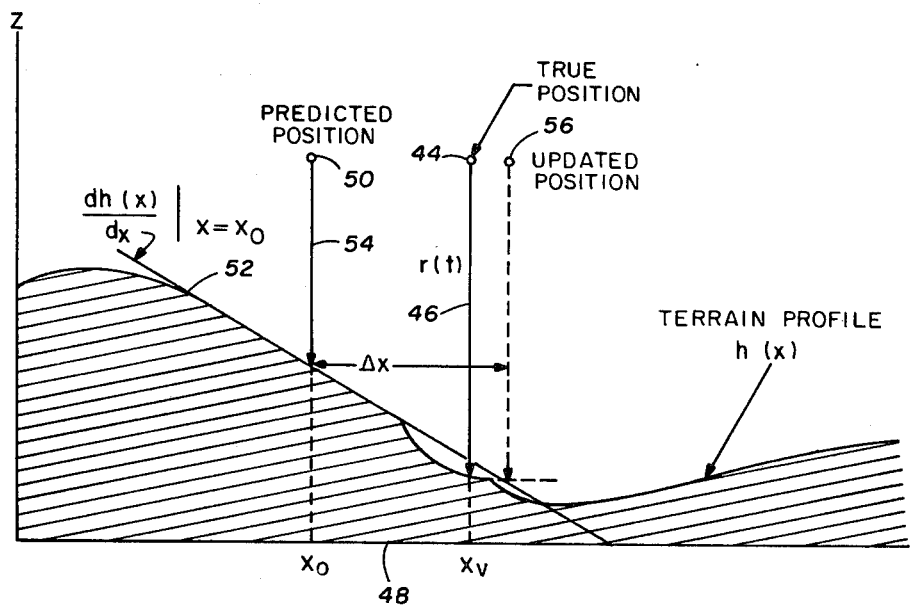
FIG. 3 is a plot of a terrain profile in one direction illustrating linearized position update.

Referring to FIG. 3, the computational process for generating vehicle position update data and vehicle velocity update data will now be explained. While FIG. 3 is a diagram of terrain in the X and Z dimensions, it should be recognized that the third dimension exists. Assuming an aircraft is flying at a position 44 and taking ground clearance measurements along the line 46, then the height of the terrain above a reference datum 48 is equal to the measured height of the aircraft at the position 44 above the reference datum 48 minus the radar measurement to the terrain. The navigation system 26 provides data to the computational processor 22 relating to the predicted location of the aircraft at the point 50. The terrain height at the position X$_0$ is called from the data storage 24 thereby providing terrain profile data to the processor. The terrain slope is assumed to be approximately linear in the vicinity of the position X$_0$ to approximate the slope 52. The terrain slope 52 is a linear approximation of the slope at the position X$_0$ calculated from stored terrain elevation data. With the terrain height data from the storage 24, a predicted radar measurement value along the line 54 can be made and compared to the actual measurement made along the line 46. The difference in these radar measurements is calculated from Equation (2) producing the value $\Delta H_R$, that is, the distance from the predicted position 50 to the updated position 56 of the aircraft. The updated position 56 is where the aircraft should be flying when making the measurements at the true position 44. The difference between the positions 44 and 56 is an error position signal in the X direction input to the navigation controller 32 to adjust the course of the aircraft.

It should be understood that FIG. 3 is a simplified illustration of how the computational processor 22 generates position error signals to the navigation controller 32. The calculations are made on measured and stored data.

Figure 4:
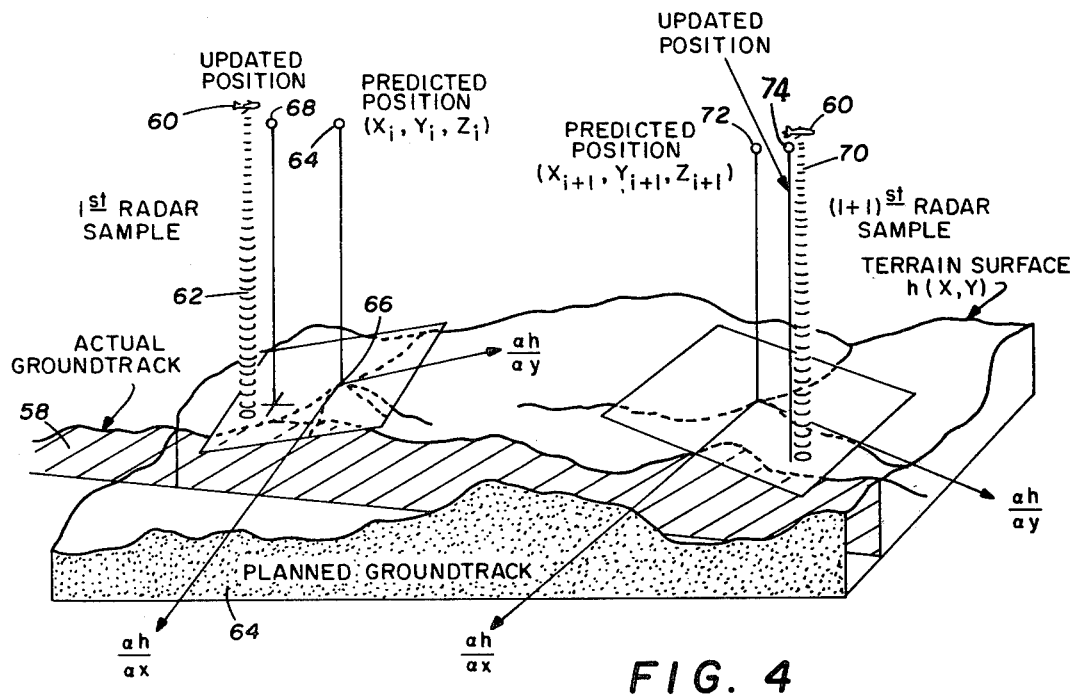
FIG. 4 is a three-dimensional terrain outline illustrating the navigation sequence of the present invention along a defined ground track.

Referring to FIG. 4, there is shown a three-dimensional illustration of an aircraft navigating along a ground track 58. The aircraft 60 takes a radar measurement along the beam 62 to collect data or take a calculation of the terrain height at the aircraft above a reference datum 64. The navigation system 26 provides three-dimensional data relating to the aircraft predicted position, with the predicted position being at the point 68.

Also provided by the navigation system 26 is three-dimensional velocity data, that is, vehicle velocity data along each of the three major axes as illustrated in FIG. 4. Again using stored reference data from the storage 24 and terrain slope calculations at point 66 in both the X-direction and the Y-direction, the updated position of the aircraft 60 is calculated at the point 68. The error between the true position and the desired position in the X, Y and Z-directions is input to the navigation controller 32 to adjust the position of the aircraft 60 to the point 68.

A single measurement does not yield sufficient information for updating the aircraft position. Errors exist in all measurements and in the source data from the storage 24 and the terrain slope calculation is only an approximation. Also, a single radar measurement does not yield unique position information. Thus, a second sample is taken by the aircraft 60 along the beam 70 with the navigation system 26 providing information on a predicted position 72. From the predicted position data, the radar measurement, the data from the storage 24 an updated position 74 is calculated for the aircraft 60. However, errors still exist and the measurement for the predicted position 74 is no more accurate than the measurement for the predicted position 64. To minimize the error for each measured position of the aircraft 60 the data is processed recursively in the determination of the position and velocity of the aircraft.

Figure 5:
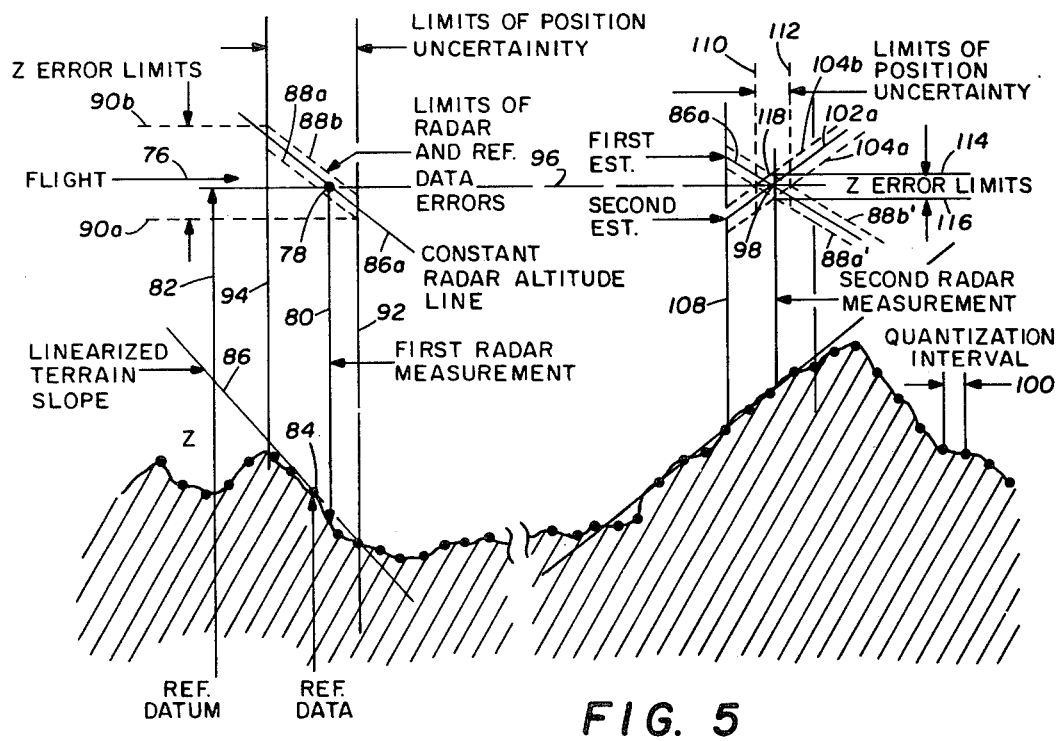
FIG. 5 is a one-dimensional terrain profile illustrating the recursive update of discrete navigation points along a navigation path.

Referring to FIG. 5, this illustrates the recursive process for computing navigation commands to the control unit 36. Assuming a vehicle is moving across the illustrated terrain in the direction of the flight arrow 76 and a first radar measurement is taken at a point 78 to measure the terrain clearance as indicated by the line 80. Also the clearance above a reference datum is measured as indicated by the line 82. Again, the predicted position of the aircraft at a point 84 is determined from data received from the navigation system 26 to calculate the terrain slope and estimate an update of the aircraft position. Also, assume that the error in this position is such that it is known that the vehicle is between the limits 92 and 94.

The terrain slope line 86 is reproduced for purposes of illustration at 86a passing through the aircraft position 78. As explained, errors exist in the radar measurement and also in the reference data storage and the exact position of the terrain slope line 86a is ambiguous between the boundaries 88a and 88b. These boundary lines indicate the error limit from the measured radar data and the stored reference data. As a result, the measurement of the flight path above the reference datum is uncertain as between the error limit lines 90a and 90b. Thus, the measured position of the aircraft will be located somewhere between lines 86a and 86b and between the position limit lines 92 and 94.

This degree of uncertainty as to the position of the aircraft is then carried over into the calculation of the updated position as explained with reference to FIGS. 3 and 4. An accurate position update is thus not possible because of insufficient data at this point.

As the vehicle moves along the flight path 96 in the direction of the flight arrow 76 another radar measurement is taken at a distance equal to one quantization interval or cell at a point 98. Adjacent cells are not shown on the illustration for clarity; however, the quantization interval 100 shows the distance traveled by an aircraft between adjacent cells.

For the second radar measurement at a point 98 it must be assumed that the same errors will occur in the radar reference data and in the measurement above the reference datum. The terrain slope line 102 is calculated from the reference data supplied by the data storage 24 which again is reproduced as line 102a passing through the second measurement point 98. The radar and reference error limits are shown by the lines 104a and 104b such that the terrain slope line 102a may be anywhere between these error limits. The error limit lines 88a and 88b from the first measurement point 78 are projected to the second measurement point 98 to establish limits of position uncertainty as given by the lines 106 and 108. Again, there is a degree of uncertainty as to the position of the aircraft with measurements taken at the point 98.

To reduce the limits of position uncertainty, the data generated from the first radar measurement at the position 78, and as stored by the computational processor 22, is now projected to the second measurement point 98. To achieve this projection, vehicle velocity data as provided by the navigation system 26 is utilized to computationally advance the data generated at the first measurement point 78 to coincide with the second measurement point 98. This first estimate is projected to the second measurement point 98 with the terrain slop line 86a indicated by the line 86a' and the radar and reference data limits indicated by the lines 88a' and 88b'. The computational processor 22 now combines the data from the first radar measurement and the second radar measurement to limit the error of the reference datum measurement to the lines 114 and 116 and the limits of position uncertainty is now given between the lines 110 and 112. Thus, the measured location of the aircraft is now established to be within the diamond shaped outline 118. It can now be seen that the vehicle position uncertainty is limited to the area between the first and second estimate intersections thereby enabling the calculation of vehicle update position.

This recursive process continues with each subsequent radar measurement combining the data as previously combined with the latest radar measurement. That is, data defining the vehicle position within the diamond shaped outline 118 is brought forward and combined with the third radar measurement to further restrict the error limit and improve the position of uncertainty.

Each time another radar measurement is made position update data is generated for calculating vehicle position and vehicle velocity and this update data is input to the navigation controller 32 that combines the update data with the output of the navigation system 26 to generate navigation commands to the control unit 36. At each radar measurement, vehicle position is updated and measurement errors are minimized by recursively calculating the limits of position uncertainty. This permits calculation of corrective commands at discrete intervals along the flight path of an established ground track, such as the ground track 58.

While only one embodiment of the invention, together with modifications thereof, has been described in detail herein and shown in the accompanying drawings, it will be evident that various further modifications are possible without departing from the scope of the invention.

What is claimed is:

1. A vehicle navigation system, comprising:
   terrain sampling means for determining at spaced time intervals the elevation of terrain beneath the vehicle and generating point by point data samples of terrain elevation,
   a dead reckoning guidance system for providing vehicle position and velocity signals,
   data storage means containing prerecorded point by point terrain data,
   a computational processor responsive to the point by point samples of terrain elevation, vehicle position and velocity signals, and prerecorded point by point terrain data to generate a current predictive position signal and combine the current predictive position signal with a previously generated and stored updated position signal into a new updated position signal for providing discrete signal samples of vehicle velocity correction and vehicle position correction, and
   a navigation controller responsive to the signal samples from said computational processor to generate vehicle navigation signals.

2. A vehicle navigation system as set forth in claim 1 wherein said computational processor responds to the data samples of terrain elevation to generate a new current predictive signal for updating the discrete signal samples of each of the spaced time intervals.

3. A vehicle navigation system as set forth in claim 1 wherein said computational processor responds to error characteristic signals representing characteristic errors of said terrain sampling means and said dead reckoning guidance system.

4. A vehicle navigation system, comprising:
   terrain sampling means for determining at spaced time intervals the elevation of terrain beneath the vehicle and generating point by point data samples of terrain elevation,
   a dead reckoning guidance system for providing vehicle position and vehicle velocity signals,
   data storage means containing prerecorded point by point terrain data,
   a computational processor responsive to the point by point samples of terrain elevation and the prerecorded point by point terrain data to generate a current predictive position signal, said processor further including Kalman filtering responsive to the current predictive position signal, vehicle position signals and vehicle velocity signals and a previously generated updated position signal to generate a new updated position signal for providing discrete signal samples of vehicle velocity correction and vehicle position correction, and
   a navigation controller responsive to the signal samples from said computational processor to generate vehicle navigation signals.

5. A vehicle navigation system as set forth in claim 4 wherein the Kalman filtering receives error characteristic signals representing characteristic errors of said terrain sampling means and said dead reckoning guidance system.

6. A vehicle navigation system as set forth in claim 4 wherein the point by point samples of terrain elevation include a terrain clearance measurement, and a reference clearance measurement and the computational processor generates updated position signals in accordance with the expression:

$$\Delta H_R = Z_R - h(xy)$$

where:
$H_R$ = terrain clearance measurement,
$Z_R$ = reference clearance measurement, and
$h(xy)$ = terrain altitude prerecorded data.

7. A vehicle navigation system, comprising:
   a ground clearance altimeter generating a terrain clearance signal,
   an absolute altimeter generating a reference clearance signal representative of the vehicle position with respect to a reference level, a data storage means containing prerecorded point by point terrain data, a dead reckoning guidance system for providing vehicle position and vehicle velocity signals, a computational processor responsive to the terrain clearance signal, the reference clearance signal, vehicle position and vehicle velocity signals, and prerecorded point by point terrain data to generate a current predictive position signal and combine the current predictive position signal with a previously generated and stored updated position signal into a new updated position signal for providing point by point signal samples of vehicle velocity correction and vehicle position correction, and a navigation controller responsive to the signal samples from said computational processor to generate vehicle navigation signals.

8. A vehicle navigation system as set forth in claim 7 wherein said computational processor includes Kalman filtering for recursively generating the updated position signal from previously generated predictive position signals, previously generated updated position signals, and current positional and vehicle velocity data.

9. A vehicle navigation system as set forth in claim 8 wherein said Kalman filtering responds to error characteristic signals representing characteristic errors of the ground clearance altimeter, the absolute clearance altimeter and the dead reckoning guidance system.

10. A method of vehicle navigation, comprising the steps of:
(a) generating point by point data samples of terrain height below a vehicle above a reference datum at spaced time intervals,
(b) predicting the position of the vehicle by data output from a navigation system,
(c) storing prerecorded point by point terrain height data,
(d) generating an updated vehicle position signal from the generated point by point data samples, the predicted position data from the navigation system and the prerecorded point by point terrain height data,
(e) repeating steps (a) - (d) for a subsequent position of the vehicle along a traversing path,
(f) generating vehicle velocity signals from data output from the navigation system,
(g) combining the generated updated vehicle position signal of step (d) with the vehicle velocity signals to project said updated vehicle position signal to the subsequent position of step (e),
(h) recursively processing the projected vehicle position signal with the updated position signal of step (e) into a new updated position signal, and
(i) generating vehicle velocity correction and vehicle position correction signals from the new updated position signal.

11. The method of vehicle navigation as set forth in claim 10 including the steps of:
(j) repeating step (e) for additional subsequent positions of the vehicle along the traversing path,
(k) combining the new updated position signal of step (h) with the vehicle velocity signals to project said updated position signal to the last position of step (j),
(l) repeating step (h) for each position of step (j) and each updated position signal of step (k), and
(m) repeating step (i) for each repetition of step (l).

12. The method of vehicle navigation as set forth in claim 10 wherein the step of recursively processing includes Kalman filtering for generating the updated position signal.

13. A method of vehicle navigation, comprising the steps of:
(a) generating at spaced time intervals updated vehicle position signals from point by point terrain height data samples, predicted position data from a navigation system and previously recorded point by point terrain height data,
(b) combining the generated next to last updated vehicle position signal of step (a) with vehicle velocity signals to project said updated vehicle position signal to the next time interval,
(c) recursively processing the projected updated vehicle position signal of step (b) with the next subsequent updated vehicle position signal to step (a) into a new updated position signal,
(d) repeating steps (a) through (c) for each subsequent data point, and
(f) generating vehicle velocity correction and vehicle position correction signals for each updated position signal.

* * * * *